United States Patent
Park et al.

(10) Patent No.: US 10,837,932 B2
(45) Date of Patent: Nov. 17, 2020

(54) APPARATUS AND METHOD FOR DETECTING DAMAGE TO VEHICLE

(71) Applicants: HYUNDAI MOTOR COMPANY, Seoul (KR); KIA MOTORS CORPORATION, Seoul (KR)

(72) Inventors: Jaesung Park, Yongin-Si (KR); Junhyuk Choi, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 124 days.

(21) Appl. No.: 16/132,983

(22) Filed: Sep. 17, 2018

(65) Prior Publication Data

US 2019/0391098 A1 Dec. 26, 2019

(30) Foreign Application Priority Data

Jun. 20, 2018 (KR) .................. 10-2018-0070792

(51) Int. Cl.
*G01N 27/04* (2006.01)

(52) U.S. Cl.
CPC ......... *G01N 27/045* (2013.01); *G01N 27/041* (2013.01)

(58) Field of Classification Search
CPC .... G01N 27/045; G01N 27/041; G01N 27/04; G01R 27/08; G01R 31/2812; G01R 31/2813; G01R 1/203
USPC .................................................. 324/691, 693
See application file for complete search history.

(56) References Cited

U.S. PATENT DOCUMENTS

| | | | |
|---|---|---|---|
| 6,370,964 B1 * | 4/2002 | Chang | G01B 5/30 73/862.046 |
| 7,167,009 B2 * | 1/2007 | van Schoor | G01L 1/205 324/691 |
| 8,778,487 B2 * | 7/2014 | Rice | G01M 5/0033 428/221 |
| 8,788,218 B2 * | 7/2014 | Soles | G06T 7/0004 702/36 |
| 8,788,220 B2 * | 7/2014 | Soles | F41H 5/24 702/38 |
| 9,046,468 B2 * | 6/2015 | Wang | G01N 27/041 |

(Continued)

FOREIGN PATENT DOCUMENTS

| | | | |
|---|---|---|---|
| DE | 102014014835 A1 * | 4/2016 | |
| DE | 102014014835 A1 * | 4/2016 | |

(Continued)

OTHER PUBLICATIONS

Galea etal.,Use of Piezoelectric Films in Detecting and Monitoring Damage in Composites. Journal of Intelligent Material Systems and Structures, vol. 4—Jul. 1993 (Year: 1993).*

(Continued)

*Primary Examiner* — Patrick Assouad
*Assistant Examiner* — Sean Curtis
(74) *Attorney, Agent, or Firm* — Morgan, Lewis & Bockius LLP (57) ABSTRACT

An apparatus for detecting damage to a vehicle includes: a damage detecting film attached to a surface of the vehicle to represent a different electrical characteristic according to a type of damage to the surface of the vehicle; and a detector configured to detect a change of the electrical characteristic represented by the damage detecting film.

18 Claims, 8 Drawing Sheets

(56) References Cited

U.S. PATENT DOCUMENTS

| | | | | |
|---|---|---|---|---|
| 9,068,929 B2* | 6/2015 | Nadel | | G01N 27/22 |
| 9,284,064 B2* | 3/2016 | Grossmann | | G01N 27/04 |
| 9,581,629 B2* | 2/2017 | Zhu | | G01N 27/24 |
| 10,196,153 B2* | 2/2019 | Lamberti | | G01M 5/0083 |
| 10,641,723 B2* | 5/2020 | Li | | E21B 47/007 |
| 2010/0052704 A1* | 3/2010 | Fay | | G01N 17/04 |
| | | | | 324/700 |
| 2011/0210014 A1* | 9/2011 | Garosshen | | G01N 27/121 |
| | | | | 205/776.5 |
| 2011/0226066 A1* | 9/2011 | Anand | | G01B 7/20 |
| | | | | 73/777 |
| 2013/0134992 A1* | 5/2013 | Zhu | | G01M 3/182 |
| | | | | 324/658 |
| 2014/0132289 A1* | 5/2014 | Grossmann | | B64D 45/02 |
| | | | | 324/693 |
| 2014/0292357 A1* | 10/2014 | Chai | | G01M 5/0033 |
| | | | | 324/693 |
| 2015/0309099 A1* | 10/2015 | Zhu | | G01M 3/18 |
| | | | | 324/663 |
| 2015/0377814 A1* | 12/2015 | Schindelholz | | G01N 27/026 |
| | | | | 324/693 |
| 2016/0152352 A1* | 6/2016 | Grossmann | | B64F 5/60 |
| | | | | 324/722 |
| 2016/0238547 A1* | 8/2016 | Park | | C08K 7/24 |
| 2017/0313436 A1* | 11/2017 | Lamberti | | G01N 27/20 |
| 2018/0209928 A1* | 7/2018 | Li | | E21B 47/007 |
| 2019/0391098 A1* | 12/2019 | Park | | G01N 27/045 |

FOREIGN PATENT DOCUMENTS

| | | | |
|---|---|---|---|
| JP | 2003-130857 A | * | 5/2003 |
| JP | 2003-130857 A | * | 5/2003 |
| KR | 10-1999-0033040 A | | 5/1999 |
| KR | 10-0765889 B1 | | 10/2007 |

OTHER PUBLICATIONS

English Translation of DE 10 2014014835 A1—Andres Heine dated Apr. 7, 2016 (Year: 2019).*

* cited by examiner

| CLASSIFICATION | NORMAL | DENT | SCRATCH | PERFORATION |
|---|---|---|---|---|
| STRUCTURE | INSULATOR / CONDUCTOR / RESISTOR / INSULATOR / CONDUCTOR | | | |
| EQUIVALENT CIRCUIT | MAINTAIN INTRINSIC RESISTANCE VALUE | INCREASE IN DENSITY OF RESISTOR → DECREASE IN RESISTANCE / DECREASE IN TOTAL RESISTANCE VALUE | INCREASE IN TOTAL RESISTANCE VALUE | INCREASE IN TOTAL RESISTANCE VALUE |
| EXAMPLE | COMPOSITE RESISTANCE: 3kΩ | COMPOSITE RESISTANCE: 0.8kΩ | COMPOSITE RESISTANCE: 4.5kΩ | COMPOSITE RESISTANCE: 4.5kΩ |

APPARATUS AND METHOD FOR DETECTING DAMAGE TO VEHICLE

CROSS-REFERENCE TO RELATED APPLICATION

This application is based on and claims priority under 35 U.S.C. § 119 to Korean Patent Application No. 10-2018-0070792, filed on Jun. 20, 2018 in the Korean Intellectual Property Office, the disclosure of which is incorporated herein by reference.

TECHNICAL FIELD

The present disclosure relates to an apparatus for detecting damage to a vehicle, and a method for the same.

BACKGROUND

In a car rental system or a car sharing system, vehicles are shared by a plurality of users. For example, when a plurality of users need a vehicle, a single vehicle may be rented. When a vehicle is damaged during the use of the car sharing system, a user who has caused the damage and a usage period for which the damage has occurred are not easily identified, thus having difficulty in clarifying the matter of responsibility.

SUMMARY

An object of the present disclosure provides a damage detecting film capable of easily and conveniently detecting damage to a surface of a vehicle.

Additional aspects of the disclosure will be set forth in part in the description which follows and, in part, will be obvious from the description, or may be learned by practice of the disclosure.

According to an exemplary embodiment of the present disclosure, an apparatus for detecting damage to a vehicle includes: a damage detecting film attached to a surface of the vehicle to represent a different electrical characteristic according to a type of damage to the surface of the vehicle; and a detector configured to detect a change of the electrical characteristic represented by the damage detecting film.

The damage detecting film may be divided into portions to be attached to surfaces of the vehicle.

The detector may be provided with a plurality of detectors respectively corresponding to the portions of the damage detecting film.

The apparatus may further include a controller configured to determine an occurrence of damage to the vehicle on the basis of a change in the electrical characteristic of the damage detecting film detected by the detector.

The detector may be connected to the controller via a wireless communication network.

The wireless communication network may be implemented using a radio frequency identification (RFID) communication method.

The detector may be connected to the controller via a wired communication network.

The wired communication network may be a controller area network (CAN) communication network.

The damage detecting film may include a resistor.

The damage detecting film may have a structure in which an insulator, a conductor, a resistor, a conductor, and an insulator are consecutively stacked one on top of another.

The damage detecting film may include a dielectric.

The damage detecting film may have a structure in which an insulator, a conductor, a dielectric, a conductor, and an insulator are consecutively stacked one on top of another.

The controller may stop detecting damage to the vehicle under a condition in which the apparatus does not perform a normal detection of damage.

The condition in which the apparatus does not perform a normal detection of damage may include: a structure of the damage detecting film including a dielectric; and a condition in which the dielectric of the damage detecting film is misrecognized as damage to the vehicle due to rainwater.

According to another exemplary embodiment of the present disclosure, a method of detecting damage to a vehicle includes: detecting an electrical characteristic from a damage detecting film that is attached to a surface of the vehicle to represent a different electrical characteristic according to a type of damage to the surface of the vehicle; and detecting damage to the surface of the vehicle through a change of the electrical characteristic detected from the damage detecting film.

The damage detecting film may be divided into portions to be attached to surfaces of the vehicle, and the method may further include: detecting an occurrence and position of damage to the surface of the vehicle through the change in electrical characteristic detected from each of the attached portions of the damage detecting film.

The method may further include: generating vehicle damage information by determining occurrence of damage to the vehicle from the change in the electrical characteristic of the damage detecting film; and outputting the generated vehicle damage information through a display provided inside the vehicle.

The method may further include transmitting the vehicle damage information to a server at a remote site such that a post-processing process of compensating for the damage to the vehicle is performed.

The method may further include stopping detecting of damage to the vehicle under a condition in which a normal detection of damage is not performed.

The condition in which a normal detection of damage is not performed may include: a structure of the damage detecting film including a dielectric; and a condition in which the dielectric of the damage detecting film is misrecognized as damage to the vehicle due to rainwater.

According to another exemplary embodiment of the present disclosure, a method of detecting damage to a vehicle includes: detecting an electrical characteristic from a damage detecting film that is attached to a surface of the vehicle to represent a different electrical characteristic according to a type of damage to the surface of the vehicle; detecting damage to the surface of the vehicle through a change of the electrical characteristic detected from the damage detecting film; and recording a surrounding image of the vehicle by operating a camera provided in the vehicle when it is determined that damage to the surface of the vehicle has occurred on the basis of the change in the electrical characteristic of the damage detecting film.

According to still another exemplary embodiment of the present disclosure, a vehicle includes: a damage detecting film divided into portions to be attached to surfaces of the vehicle such that the portions each represent a different electrical characteristic according to a type of damage to a corresponding surface; a detector provided with a plurality of detectors corresponding to the portions of the damage detecting film to detect the change in electrical characteristic represented by a corresponding portion of the damage detecting film; and a controller configured to determine an occurrence of damage to the vehicle from the change in electrical characteristic of the damage detecting film detected through the detector.

The damage detecting film may have a structure in which an insulator, a conductor, a resistor, a conductor, and an insulator are consecutively stacked one on top of another.

The damage detecting film may have a structure in which an insulator, a conductor, a dielectric, a conductor, and an insulator are consecutively stacked one on top of another.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
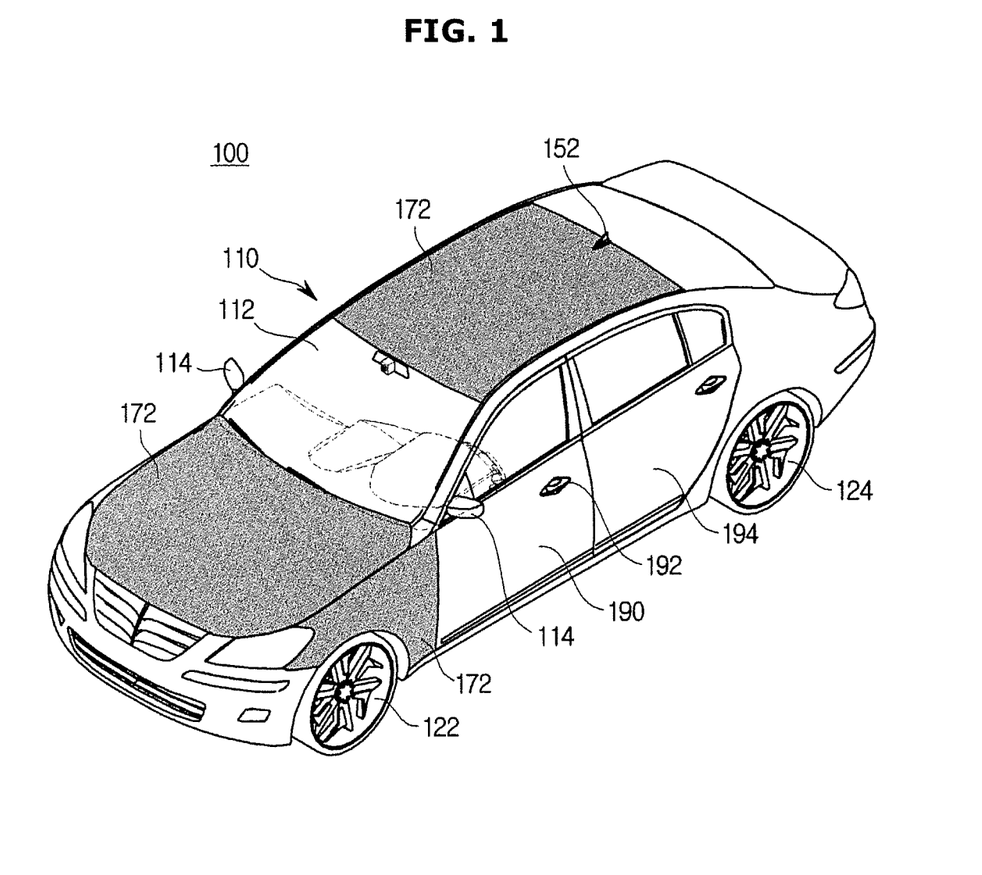
FIG. 1 is a view illustrating a vehicle according to an embodiment of the present disclosure.

FIG. 1 is a view illustrating a vehicle according to an embodiment of the present disclosure. Referring to FIG. 1, a vehicle 100 has an external structure as follows.

A windshield 112 is provided on an upper front side of a vehicle body 110 to protect an occupant from the wind while providing a front view to the occupant inside the vehicle 100. Outside mirrors 114 provide the occupant with a side view and a rear view of the vehicle 100. The outside mirror 114 may be provided on each side of the left and right doors 190.

Doors 190 and 194 are rotatably provided on the left and right sides of the vehicle body 110. When the doors 190 and 194 are opened, the occupant may enter or exit the vehicle 100. When the doors 190 and 194 are closed, the interior of the vehicle 100 may be shielded from the outside. The door 190 and 194 may be divided into a driver-seat door 190 and a rear-seat door 194.

An antenna 152 is provided to receive broadcasting/communication signals for telematics, digital multimedia broadcasting (DMB), digital televisions, global positioning systems (GPS), and the like, and may be a multifunctional antenna for receiving various types of broadcasting/communication signals, or a single function antenna for receiving a single type of broadcasting/communication signals.

A front wheel 122 and a rear wheel 124 are located at a front side and a rear side of the vehicle 100 so as to be rotated by power received from an engine (not shown).

A resistance film 172, which is a damage detecting film, is installed on each portion of the outer surface of the vehicle 100 to check damage to a corresponding portion. Here, 'a surface' refers to a plane forming the external appearance of the vehicle 100. For example, resistance films 172 are attached to surfaces of an engine room hood, front and rear fenders, a roof, doors, and the like, and damages to the corresponding portions are checked through the resistance films 172.

Figure 2:
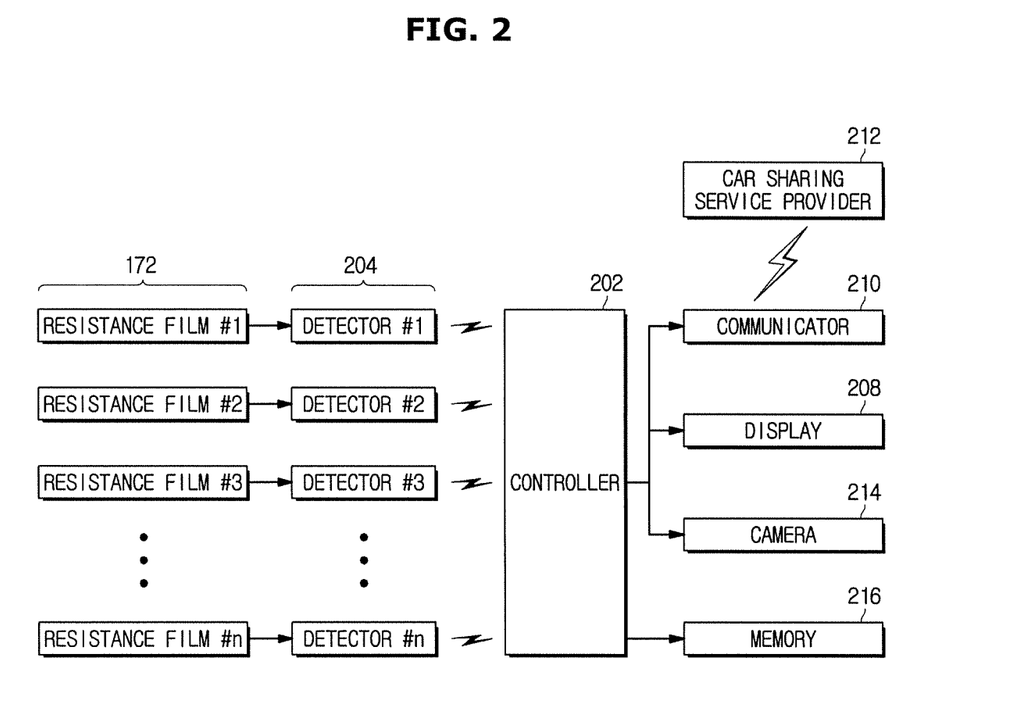
FIG. 2 is a view illustrating a control system of a vehicle according to an embodiment of the present disclosure.

FIG. 2 is a view illustrating a control system of a vehicle according to an embodiment of the present disclosure.

A controller 202 may be an electronic control unit (ECU) that controls all or part of the operations of the vehicle 100 according to an embodiment of the present disclosure.

A plurality of detectors 204 are connected to an input side of the controller 202 to perform communication. The detectors 204 may be provided in a predetermined number corresponding to the number of the resistance films 172 such that the detectors 204 correspond to the resistance films 172, respectively. Alternatively, the detectors 204 may be provided in a predetermined number less than the number of the resistance films 172 such that a single detector 204 corresponds to a plurality of the resistance films 172. The detector 204 is provided to detect a resistance value of the resistance film 172.

The resistance value detected by the detector 204 is provided to the controller 202. The controller 202 receives the resistance value of the resistance film 172 from the detector 204, and determines the occurrence of damage to the vehicle 100 on the basis of a change in the resistance value of the resistance film 172.

The controller 202 may generate vehicle damage information and output the generated vehicle damage information through a display 208 provided inside the vehicle 100. A user of the vehicle 100 may recognize that damage has occurred to the surface of the vehicle 100 through the vehicle damage information output on the display 208. The display 208 may be a screen of a navigation system, or cluster provided in the vehicle 100.

In addition, the controller 202 may generate the vehicle damage information and transmit the generated vehicle damage information to a car sharing service provider 212 located at a remote site through the communicator 210 of the vehicle 100. The car sharing service provider 212 may recognize that damage has occurred to the vehicle 100 on the basis of the vehicle damage information transmitted from the vehicle 100. The care sharing service provider 212 may perform a user-indemnified compensation process that indemnifies the user for the damage, on the basis of the vehicle damage information when the user returns the vehicle 100.

In addition, the controller 202 may activate a camera 214 provided in the vehicle 100 while generating the vehicle damage information. That is, when it is determined that damage has occurred to the surface of the vehicle 100 on the basis of a change in the resistance value of the resistance film 172, the controller 202 immediately activate the camera 214 to acquire an image of surroundings of the vehicle 100 and record the image. The image data may be used in the future as material for identifying the cause of the damage or the subject of the responsibility for the damage. An image recording apparatus for a vehicle, so-called 'a black box', records an image in response to an impact applied to the vehicle. However, in general, the image recording apparatus does not operate unless a sufficient impact is applied to the vehicle. According to an embodiment of the present disclosure, not only damage with no impact but also damage with an impact may be recognized through the change of the resistance value of the resistance film 172, and the camera 214 is immediately activated such that the imaging and recording of the surrounding environment of the vehicle are performed. The camera 214 may be a black box or an imaging device provided in the vehicle 100 to improve the driving safety or driving convenience of the vehicle 100.

When vehicle damage information is generated, the controller 202 may store the generated vehicle damage information in a memory 214.

Figure 3A:
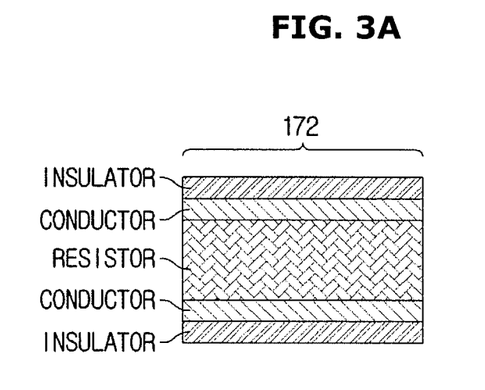
FIGS. 3A and 3B are views illustrating a structure of a resistance film according to an embodiment of the present disclosure.
Figure 3B:
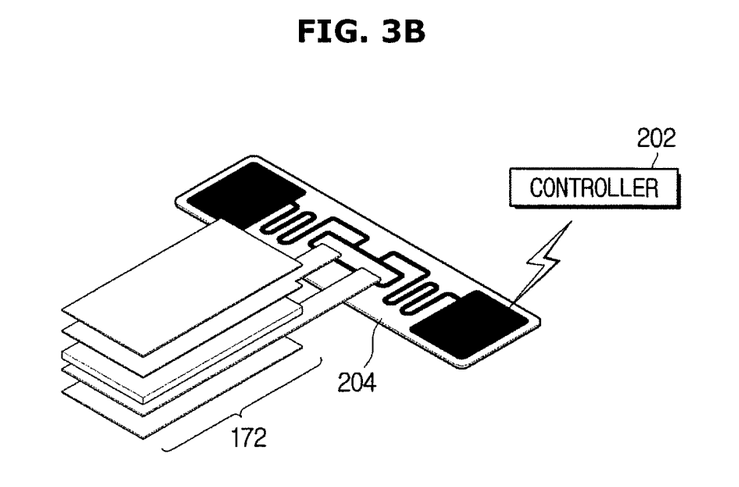

FIGS. 3A and 3B are views illustrating a structure of a resistance film according to an embodiment of the present disclosure. FIG. 3A is a cross-sectional view of the resistance film 172. FIG. 3B is a view illustrating a connection of the detector 204.

Referring to FIG. 3A, the resistance film 172 according to an embodiment of the present disclosure is provided in the form of a thin film in which an insulator, a conductor, a resistor, a conductor, and an insulator are consecutively stacked one on top of another. That is, since a resistor (for example, carbon) is coated in the form of a thin film, neither a transparent material for realizing a touch method, nor a coordinate measurement is needed, and thus a device for recognizing coordinates is not needed. Thus, the resistance film 172 in the form of a thin film is divided into a plurality of portions and attached to the surfaces of the vehicle 100 as described above with reference to FIG. 1.

Referring to FIG. 3B, the detector 204 and the controller 202 may perform communication in a wireless manner. As described above with reference to FIG. 1, the plurality of resistance films 172 are respectively attached to a plurality of portions of the vehicle 100. Each detector 204 is connected to a corresponding one of the plurality of resistance films 172 to detect a resistance value of the corresponding resistance film 172 and output the resistance value to the controller 202 in a wireless communication of a radio frequency identification (RFID). The two conductors of the resistance films 172 with the resistor interposed therebetween are partly elongated to be electrically connected to the detector 204 to communicate with the detector 204. Such a connection allows the resistance value of the resistor to be detected by the detector 204.

The detector 204 may use a RFID scheme of a 900 MHz frequency band. The RFID scheme of the 900 MHz frequency band may perform power transmission and data collection using relatively low power, thereby reducing the power consumption. In addition, the RFID system of the 900 MHz band does not cause interference at a time of radio reception of the vehicle 100.

Figure 4:
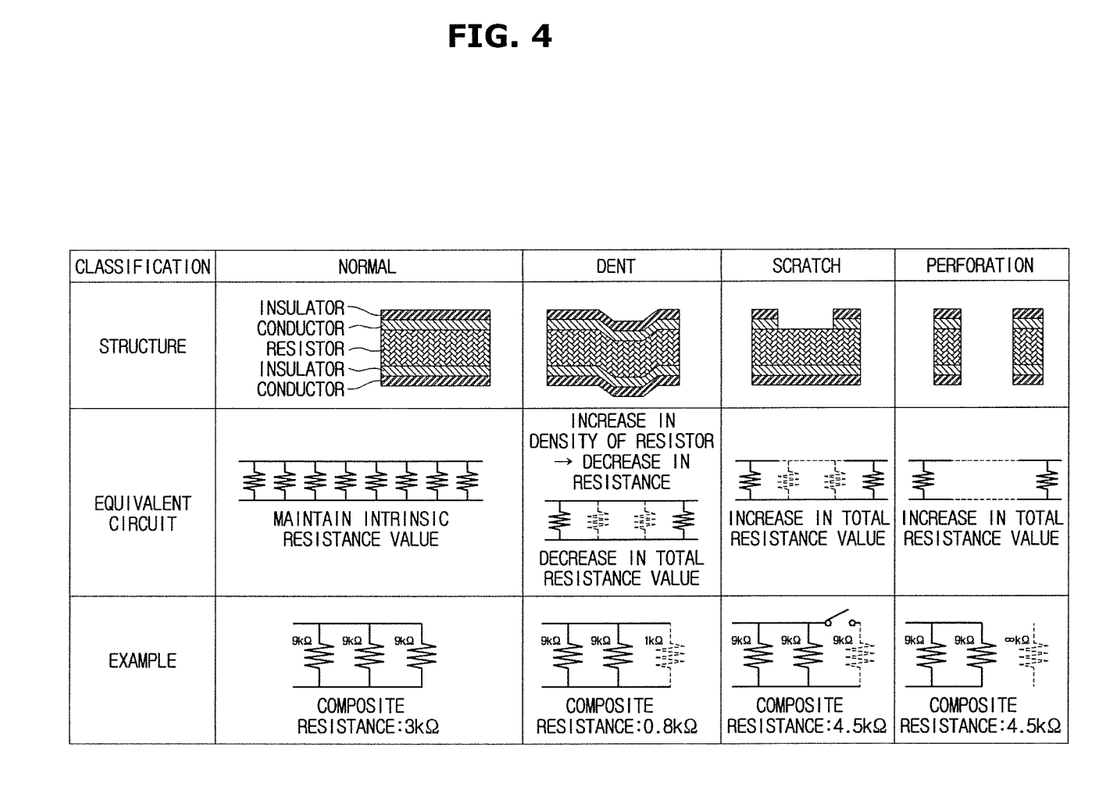
FIG. 4 is a view illustrating various examples of damage detection through a resistance film of a vehicle according to an embodiment of the present disclosure.

FIG. 4 is a view illustrating various examples of damage detection through a resistance film of a vehicle according to an embodiment of the present disclosure. FIG. 4 shows examples of the types of damage to the resistance film 172, and equivalent circuits according to the types of damage, and changes in the resistance value according to the types of damage.

The types of damage may include 'normal', 'dent', 'scratch', or 'perforation'. 'normal' represents a state in which the resistance film 172 is intact without being damaged. 'dent' represents a state in which the resistance film 172 is depressed by an impact of a stone flying at a high speed or a door of another vehicle. "scratch" represents a state in which the surface of the vehicle 100 is damaged by friction due to a contact with another structure (or another vehicle). 'Perforation' represents a state in which the surface of the vehicle 100 is perforated by a sharp object or the like. The type of damage may include other types of damage in addition to those described with reference FIG. 4. The controller 202 may detect the type of the damage on the basis of a change in a resistance value expressed by the damage.

Referring to FIG. 4, when the resistance film 172 is in a 'normal' state in which the resistance film 172 is not damaged, the equivalent resistance exhibits an intrinsic resistance value in a normal state. For example, in a 'normal' state, three resistors of 9 kΩ are connected in parallel to each other, and a composite resistance (the total resistance) of the resistance film 172 is 3 kΩ.

When the resist film 172 is subject to damage of 'dent', the density of the resistor constituting the resistance film 172 is increased and the total resistance value of the resistance film 172 is lowered. For example, when a certain one of the three resistors connected in parallel to each other is subject to damage 'dent', the composite resistance of the resistance film 172 is about 0.8 kΩ.

When the resistance film 172 is subject to damage 'scratch' or 'perforation', an electrical open state occurs to the resistance film 172, and the total resistance value of the resistance film 172 increases. For example, when one of the three resistors connected in parallel to each other is electrically opened, the composite resistance of the resistance film 172 is 4.5 kΩ, which is the same as for the case when two resistors are connected in parallel.

As described above, when the composite resistance (total resistance) of the resistance film 172 is 3 kΩ, the controller 202 may determine that the resistance film 172 is in a 'normal' state. Further, when the composite resistance (total resistance) of the resistance film 172 is changed to 0.8 kΩ, the controller 202 may determine that a 'dent' damage has occurred to the resistance film 172. When the composite resistance (total resistance) of the resistance film 172 is changed to 4.5 kΩ, the controller 202 may determine that a 'scratch' damage or a 'perforation' damage has occurred to the resistance film 172.

Figure 5:
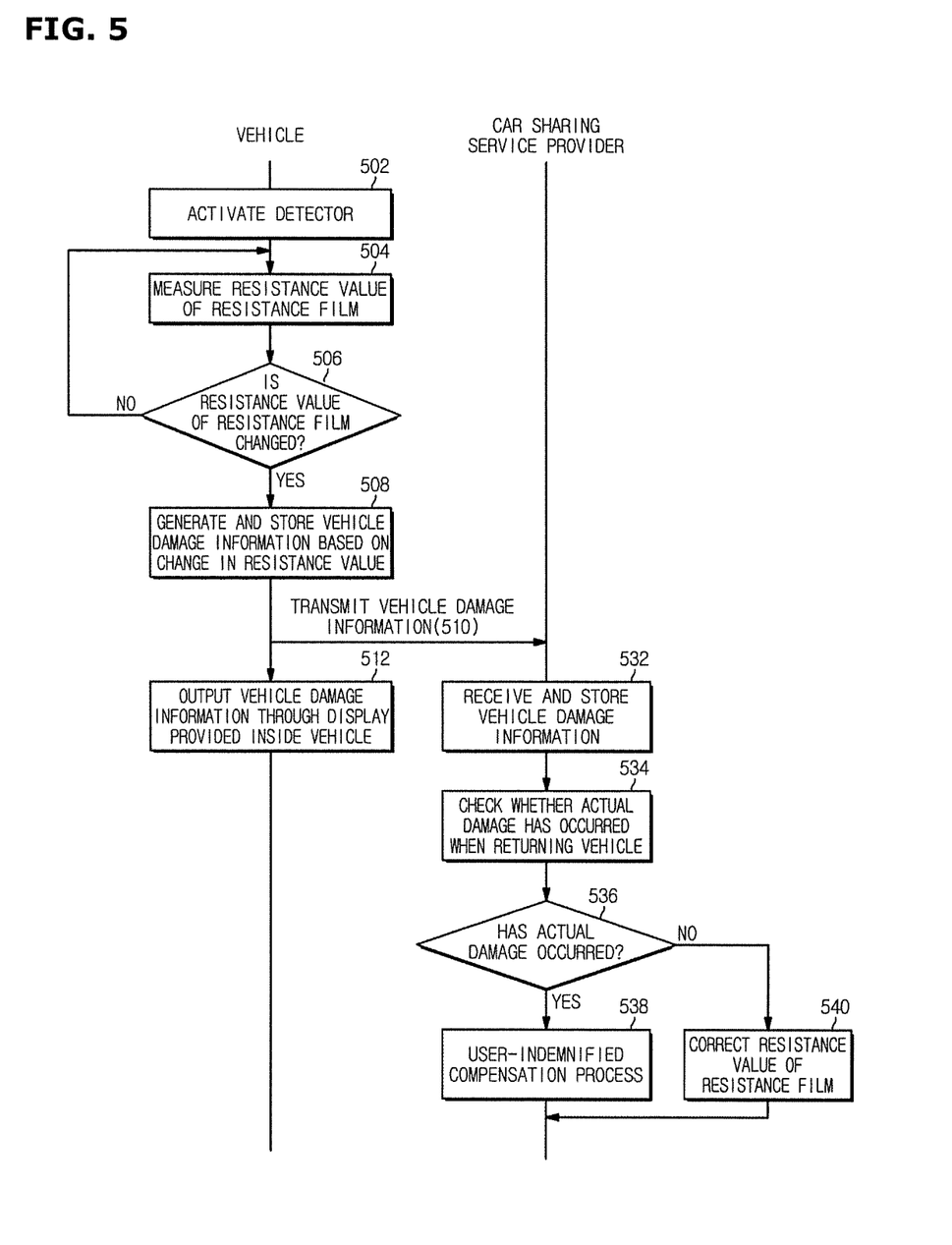
FIG. 5 is a view showing a method of detecting damage to a vehicle and a post-processing method depending on the occurrence of damage according to an embodiment of the present disclosure.

FIG. 5 is a view illustrating a flowchart for a method of detecting damage to a vehicle and a post-processing method depending on the occurrence of damage according to an embodiment of the present disclosure. Referring to FIG. 5, the vehicle 100 performs a damage detection and a damage information indication using a resistance film, and the car sharing service provider 212 performs a user-indemnified compensation process that indemnifies the user for the damage, on the basis of the detection through the resistance film 172.

Referring to FIG. 5, the controller 202 of the vehicle 100 activates the detector 204 such that the detector 204 measures the resistance value of the resistance film 172 (502).

When the detector 204 is activated such that the resistance value of the resistance film 172 is detected, the detector 204 measures the resistance value of the resistance film 172 (504). The measurement of the resistance value of the resistance film 172 by the detector 204 may be continuously performed. Alternatively, the measurement of the resistance value of the resistance film 172 by the detector 204 may be intermittently performed at predetermined intervals. Alternatively, the measurement of the resistance value of the resistance film 172 by the detector 204 may be performed in a combination of the continuous method and the intermittent method.

When the resistance value of the resistance film 172 is not changed and is maintained at the resistance value in the 'normal' state (NO in 506), the process returns to operation 504 described above, and the measurement of the resistance value of the resistance film 172 continues.

When the resistance value of the resistance film 172 is changed and deviates from the resistance value of the 'normal' state (YES in 506), the controller 202 generates vehicle damage information on the basis of a change in the resistance value, and stores the generated vehicle damage information in the memory 214 (508). That is, the controller 202 identifies the position, the time (date), and the type of the damage of the vehicle 100 from a change in the resistance value of the resistance film 172, and stores the identified information as vehicle damage information in the memory 214.

In addition, the controller 202 may transmit the vehicle damage information to the car sharing service provider 212 at a remote place through the communicator 210 (510). The transmitted vehicle damage information may be stored in a server of the car sharing service provider 212.

In addition, the controller 202 controls the display 208 provided in the vehicle 100 to output the generated vehicle damage information (512). The display 208 may be a screen of a navigation system or a cluster provided in the vehicle 100.

The car sharing service provider 212 having received the vehicle damage information from the controller 202 of the vehicle 100 stores the received vehicle damage information in the server (532). In this manner, the vehicle damage information received and stored by the car sharing service provider 212 may be used as a basis for clarifying the responsibility for compensating for the damage that has occurred to the vehicle 100, which will be described later.

When a customer, that is, a user who uses the vehicle 100 through a car sharing service returns the vehicle 100, a representative of the car sharing service provider may check whether an actual damage has occurred to the vehicle 100 on the basis of the vehicle damage information stored in the server (534). For example, when the vehicle damage information indicates that damage has occurred to the resistance film 172 attached to a front fender of the vehicle 100, the representative may check whether the front fender of the vehicle 100 is damaged with naked eyes.

When the front fender of the vehicle 100 is actually damaged (YES in 536), the damage is imputable to the user (the customer) of the vehicle 100, and thus the car sharing service provider proceeds with a user-indemnified compensation process that indemnifies the user for the damage such that the user (the customer) of the vehicle 100 compensates for the damage (538).

When damage is detected to have occurred from the resistance film 172 but the vehicle is not actually damaged (NO in 536), the resistance value of the resistance film 172 of the corresponding portion is corrected or initialized to prepare for a detection of damage that may occur in the future (540).

Figure 6:
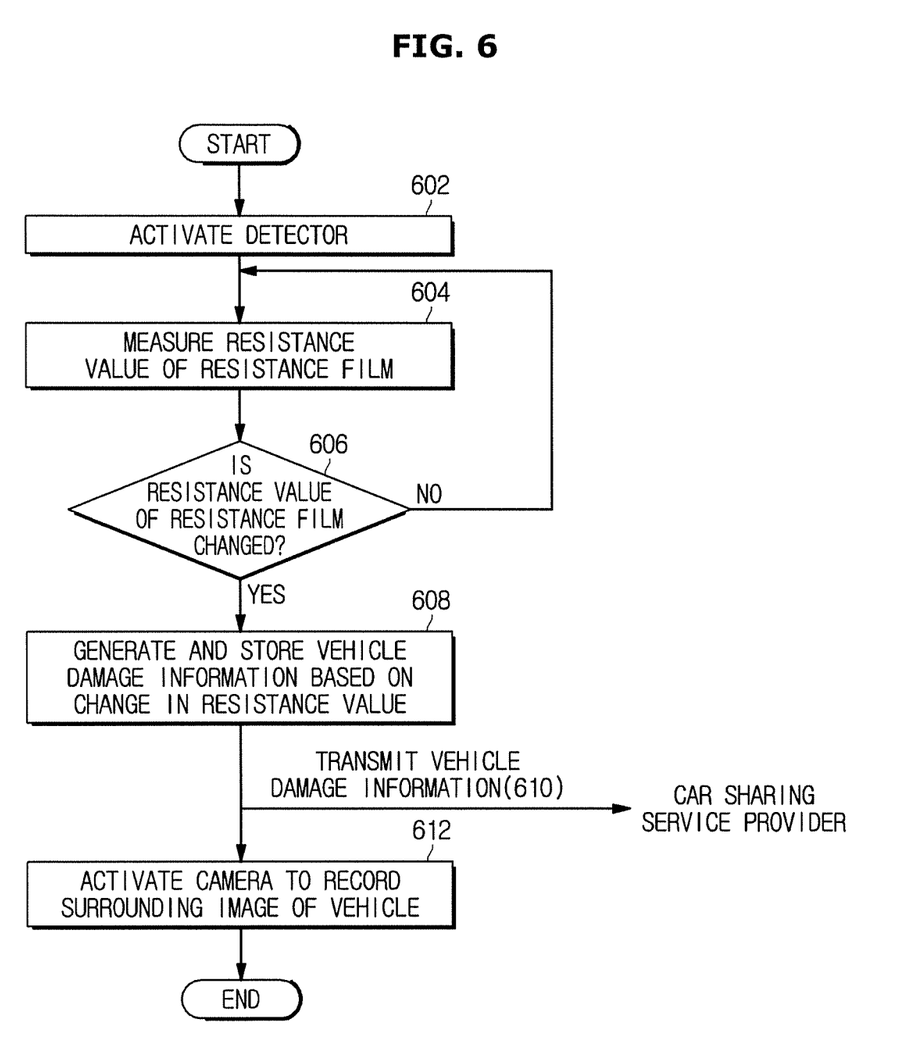
FIG. 6 is a view showing a method of detecting damage to a vehicle and a post-processing method depending on the occurrence of damage according to another embodiment of the present disclosure.

FIG. 6 is a view illustrating a flowchart for a method of detecting damage to a vehicle and a post-processing method depending on the occurrence of damage according to another embodiment of the present disclosure. In FIG. 6, the vehicle 100 performs a damage detection using the resistance film 172 while performing an activation of a black box for automatic recording.

Referring to FIG. 6, the controller 202 of the vehicle 100 activates the detector 204 such that the detector 204 measures the resistance value of the resistance film 172 (602).

When the detector 204 is activated such that the resistance value of the resistance film 172 is detected, the detector 204 measures the resistance value of the resistance film 172 (604). The measurement of the resistance value of the resistance film 172 by the detector 204 may be continuously performed. Alternatively, the measurement of the resistance value of the resistance film 172 by the detector 204 may be intermittently performed at predetermined intervals, or the measurement of the resistance value of the resistance film 172 by the detector 204 may be performed in a combination of the continuous method and the intermittent method.

When the resistance value of the resistance film 172 is not changed and is maintained at the resistance value in the 'normal' state (NO in 606), the process returns to operation 604 described above, and the measurement of the resistance value of the resistance film 172 continues.

When the resistance value of the resistance film 172 is changed and deviates from the resistance value of the 'normal' state (YES in 606), the controller 202 generates vehicle damage information on the basis of a change in the resistance value, and stores the generated vehicle damage information in the memory 214 (608). That is, the controller 202 identifies the position, the time (date), and the type of damage of the vehicle 100 from a change in the resistance value of the resistance film 172, and stores the identified information as vehicle damage information in the memory 214.

In addition, the controller 202 may transmit the vehicle damage information to the car sharing service provider 212 at a remote place through the communicator 210 (610). The transmitted vehicle damage information may be stored in a server of the car sharing service provider 212. The car sharing service provider 212 may clarify the responsibility for compensating for the damage of the vehicle 100 using the vehicle damage information transmitted from the vehicle 100, and proceed with a user-indemnified compensation process that indemnifies the user for the damage, if required, as described above in operations 532 to 540 with reference to FIG. 5.

In addition, the controller 202 may activate a camera 214 provided in the vehicle 100 while generating the vehicle damage information, to image and record the surrounding image of the vehicle 100 (612). That is, the image data may be used in the future as material for identifying the cause of the damage or the subject of the responsibility for the damage. When damage is identified using the resistance film 172 according to the present disclosure, not only damage with no impact but also damage with an impact may be sufficiently recognized through the change of the resistance value of the resistance film 172, and the camera 214 is immediately activated such that the imaging and recording of the surrounding environment of the vehicle are performed. The camera 214 may be a black box or an imaging device provided in the vehicle 100 to improve the driving safety or driving convenience of the vehicle 100. The image data acquired through the camera 214 may be also used in the future as material for identifying the cause of the damage or the responsibility for the damage.

Figure 7:
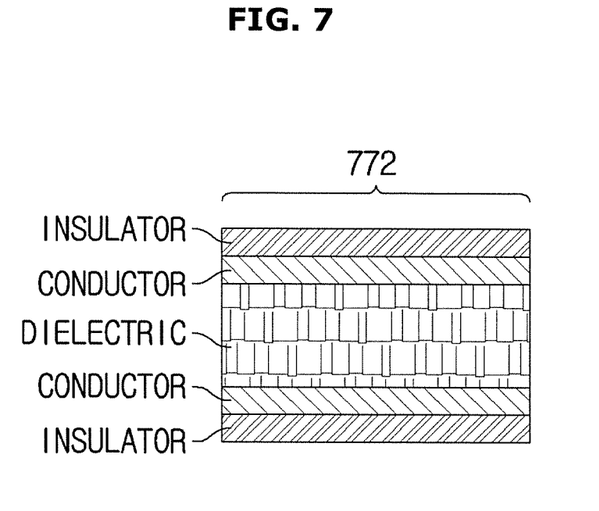
FIG. 7 is a view illustrating a structure of a resistance film according to another embodiment of the present disclosure.

FIG. 7 is a view illustrating a structure of a resistance film according to another embodiment of the present disclosure.

Referring to FIG. 7, a capacitance film 772 according to an embodiment of the present disclosure is provided in the form of a thin film in which an insulator, a conductor, a dielectric, a conductor, and an insulator are consecutively stacked one on top of another. That is, instead of using the resistor for the damage detecting film as shown in FIG. 3 according to the preceding embodiment, a dielectric is used for the damage detecting film, that is, the capacitance film 772 in the form of a thin film, and damage occurring to the vehicle 100 is recognized by detecting a change in the capacitance due to damage rather than detecting a change in the resistance value. When the dielectric is used instead of the resistor, there is a possibility that an influence by rainwater is mistakenly recognized as damage. However, the detection value of the capacitance film 772 may be corrected in connection with an operation of a rain sensor in case of rain, so that the possibility of misrecognition may be eliminated. When the capacitance film 772 has a structure including a dielectric, the damage detection of the vehicle 100 through the detector 204 may be stopped in a case when the influence by the rainwater is not removed even with the correction.

Figure 8:
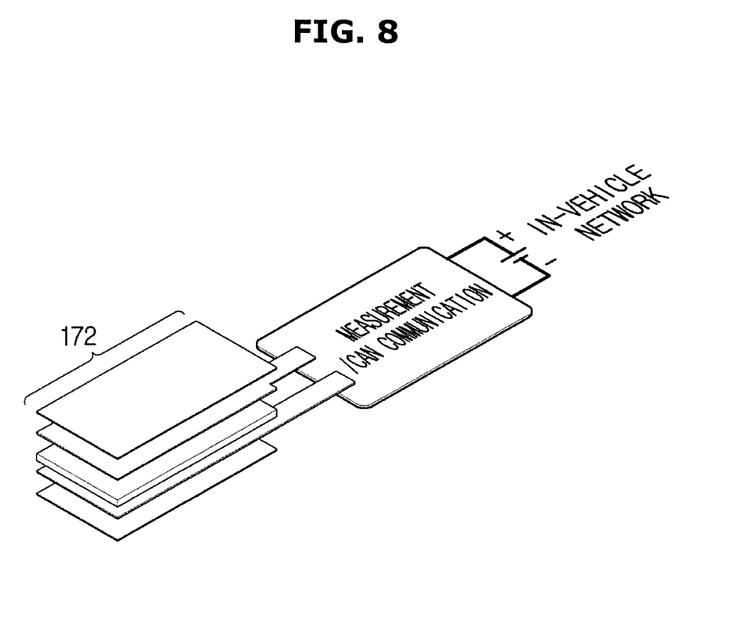
FIG. 8 is a view illustrating a detector according to another embodiment of the present disclosure.

FIG. 8 is a view illustrating a detector according to another embodiment of the present disclosure.

Referring to FIG. 8, the detector 204 and the controller 202 may communicate with each other through a control area network (CAN) communication provided inside the vehicle 100.

As is apparent from the above, the damage detecting film can easily and conveniently detect damage to a surface of a vehicle The above description of the present disclosure is for illustrative purposes, and a person having ordinary skilled in the art should appreciate that other specific modifications may be easily made without departing from the technical spirit or essential features of the present disclosure. Therefore, the above embodiments should be regarded as illustrative rather than limitative in all aspects. The scope of the disclosure is not to be limited by the detailed description set forth above, but by the accompanying claims of the present disclosure, and it should also be understood that all changes or modifications derived from the definitions and scope of the claims and their equivalents fall within the scope of the present disclosure.

What is claimed is:

1. An apparatus for detecting damage to a vehicle, the apparatus comprising: a damage detecting film attached to a surface of the vehicle to represent a different electrical characteristic according to a type of damage to the surface of the vehicle; and a detector configured to detect a change of the electrical characteristic represented by the damage detecting film, wherein the damage detecting film is divided into portions to be attached to surfaces of the vehicle, further comprising a controller: wherein the controller stops detecting damage to the vehicle under a condition in which the apparatus does not perform a normal detection of damage, and wherein the condition in which the apparatus does not perform the normal detection of damage includes a condition in which a dielectric of the damage detecting film is misrecognized as damage to the vehicle due to rainwater.

2. The apparatus of claim 1, wherein the detector includes a plurality of detectors respectively corresponding to the portions of the damage detecting film.

3. The apparatus of claim 2, wherein the controller is configured to determine an occurrence of damage to the vehicle based on the change in the electrical characteristic of the damage detecting film detected by the detector.

4. The apparatus of claim 3, wherein the detector is connected to the controller via a wireless communication network.

5. The apparatus of claim 4, wherein the wireless communication network is implemented using a radio frequency identification (RFID) communication.

6. The apparatus of claim 3, wherein the detector is connected to the controller via a wired communication network.

7. The apparatus of claim 6, wherein the wired communication network is a controller area network (CAN) communication network.

8. The apparatus of claim 1, wherein the damage detecting film includes a resistor.

9. The apparatus of claim 8, wherein the damage detecting film has a structure in which an insulator, a conductor, a resistor, a conductor, and an insulator are consecutively stacked one on top of another.

10. The apparatus of claim 1, wherein the damage detecting film has a structure in which an insulator, a conductor, the dielectric, a conductor, and an insulator are consecutively stacked one on top of another.

11. A method of detecting damage to a vehicle, the method comprising: detecting an electrical characteristic from a damage detecting film that is attached to a surface of the vehicle to represent a different electrical characteristic according to a type of damage to the surface of the vehicle; and detecting damage to the surface of the vehicle through a change of the electrical characteristic detected from the damage detecting film, wherein the damage detecting film is divided into portions to be attached to surfaces of the vehicle; and stopping the step of detecting the damage to the vehicle under a condition in which a normal detection of damage is not performed, wherein the condition in which the normal detection of damage is not performed includes: a condition in which a dielectric of the damage detecting film is misrecognized as damage to the vehicle due to rainwater.

12. The method of claim 11, wherein the method further comprises detecting an occurrence and a position of damage to the surface of the vehicle through the change in the electrical characteristic detected from each of the attached portions of the damage detecting film.

13. The method of claim 11, further comprising: generating vehicle damage information by determining an occurrence of damage to the vehicle from the change in the electrical characteristic of the damage detecting film; and outputting the generated vehicle damage information through a display inside the vehicle.

14. The method of claim 13, further comprising transmitting the vehicle damage information to a server at a remote site for a post-processing process of compensating for the damage to the vehicle.

15. A method of detecting damage to a vehicle, the method comprising: detecting an electrical characteristic from a damage detecting film that is attached to a surface of the vehicle to represent a different electrical characteristic according to a type of damage to the surface of the vehicle; detecting damage to the surface of the vehicle through a change of the electrical characteristic detected from the damage detecting film; stopping the step of detecting the damage to the vehicle under a condition in which a normal detection of damage is not performed, wherein the condition in which the normal detection of damage is not performed includes: a condition in which a dielectric of the damage detecting film is misrecognized as damage to the vehicle due to rainwater, and recording a surrounding image of the vehicle by operating a camera of the vehicle when it is determined that damage to the surface of the vehicle has occurred based on the change in the electrical characteristic of the damage detecting film, wherein the damage detecting film is divided into portions to be attached to surfaces of the vehicle.

16. A vehicle comprising: a damage detecting film divided into portions to be attached to surfaces of the vehicle such that each of the portions represents a different electrical characteristic according to a type of damage to a corresponding surface; a detector including a plurality of detectors corresponding to the portions of the damage detecting film to detect the change in electrical characteristic represented by a corresponding portion of the damage detecting film; and a controller configured to determine an occurrence of damage to the vehicle from the change in the electrical characteristic of the damage detecting film detected through the detector, and wherein the controller stops detecting damage to the vehicle under a condition in which the apparatus does not perform a normal detection of damage, and wherein the condition in which the apparatus does not perform the normal detection of damage includes a condition in which a dielectric of the damage detecting film is misrecognized as damage to the vehicle due to rainwater.

17. The vehicle of claim 16, wherein the damage detecting film has a structure in which an insulator, a conductor, a resistor, a conductor, and an insulator are consecutively stacked one on top of another.

18. The vehicle of claim 16, wherein the damage detecting film has a structure in which an insulator, a conductor, the dielectric, a conductor, and an insulator are consecutively stacked one on top of another.

* * * * *